United States Patent [19]

Scomazzon et al.

[11] Patent Number: 5,473,290

[45] Date of Patent: Dec. 5, 1995

[54] VARIABLE-THROUGHPUT DIGITAL MODULATOR AND ITS USE IN FM RADIO BROADCASTING

[75] Inventors: Pascal Scomazzon, Montigny les Metz; Pascal Pignon, Metz, both of France

[73] Assignee: Telediffusion de France, France

[21] Appl. No.: 323,691

[22] Filed: Oct. 18, 1994

[30] Foreign Application Priority Data

Oct. 19, 1993 [FR] France .................................... 93 12436

[51] Int. Cl.⁶ .................................................. H04L 27/20
[52] U.S. Cl. ......................... 332/103; 332/119; 375/281; 375/308
[58] Field of Search .................................... 332/103, 104, 332/105, 119; 375/261, 279, 281, 308, 298

[56] References Cited

U.S. PATENT DOCUMENTS 4,965,536  10/1990  Yoshida ................................. 332/103

FOREIGN PATENT DOCUMENTS 2559006  8/1985  France .
2681746  3/1993  France .
1210742  10/1970  United Kingdom .

OTHER PUBLICATIONS

Patent Abstracts of Japan, vol. 8, No. 206 (E–267) 20 Sep. 1984 & JP–A–59 092 603 (Fujitsu K.K.) 28 May 1984.

Primary Examiner—Siegfried H. Grimm
Attorney, Agent, or Firm—Larson and Taylor

[57] ABSTRACT

A variable-throughput digital modulator receives at an input a transmission digital signal e(t). The transmission digital signal is time-based demultiplexed (1) into first and second elementary transmission signals e1(t) and e2(t) which are applied, respectively, to first (21) and second (22) filtering circuits for delivering first and second filtered elementary signals e1f(t) and e2f(t). A circuit (20) provides throughput switching control to the first and second filtering circuits (21, 22) for selecting a first or second filtering mode corresponding to a first throughput at a first type of modulation or a second throughput at a second type of modulation. A quadrature modulator (3) receives the first and second filtered elementary signals in order to modulate an RDS-compatible carrier f0, and an output filter circuit (5) delivers a filtered modulated carrier signal for broadcast, such as in supplementary data broadcasting in FM radio broadcasting.

12 Claims, 5 Drawing Sheets

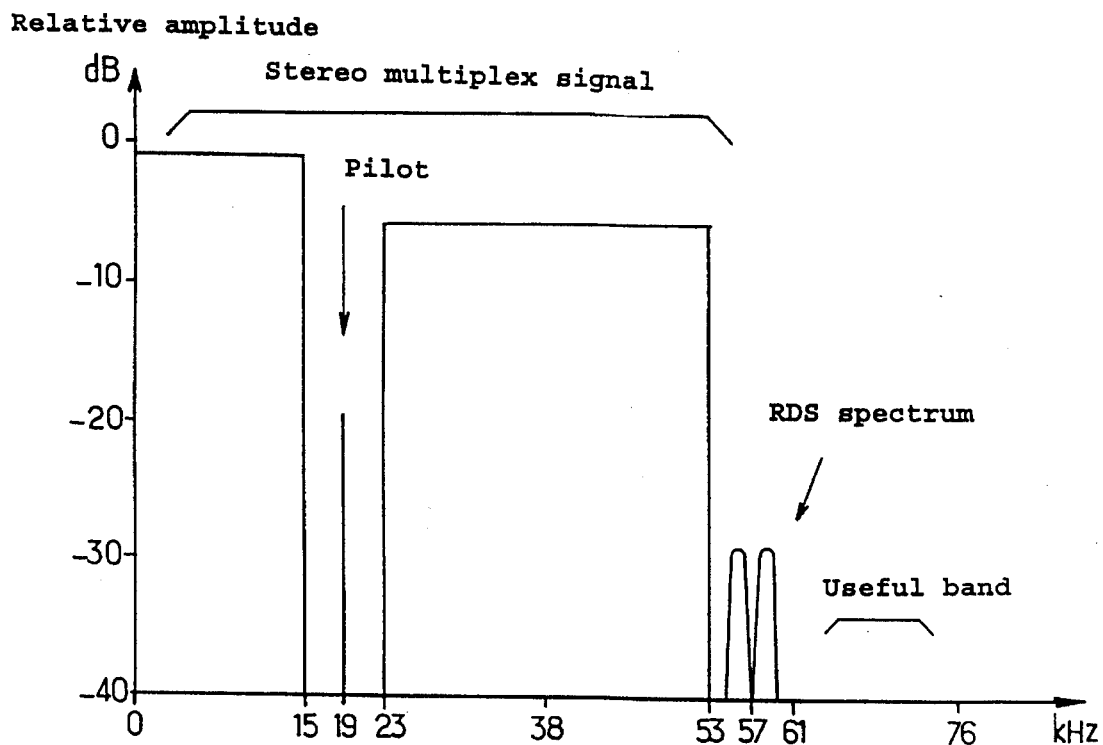
FIG. 1 SPECTRUM OF THE FM MULTIPLEX BAND SIGNAL
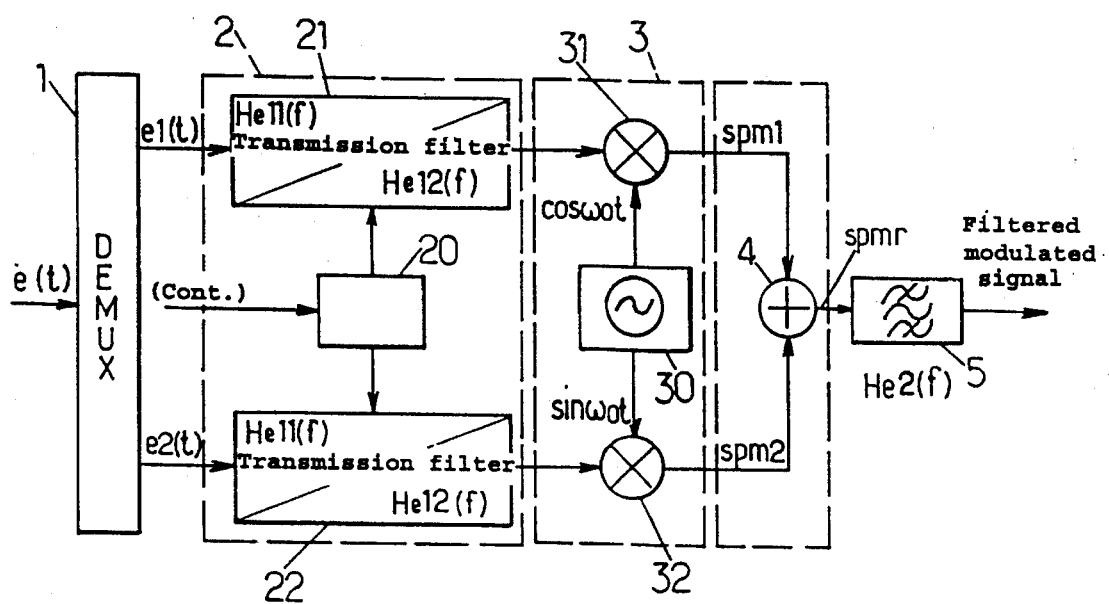
FIG. 2a THEORETICAL DIAGRAM

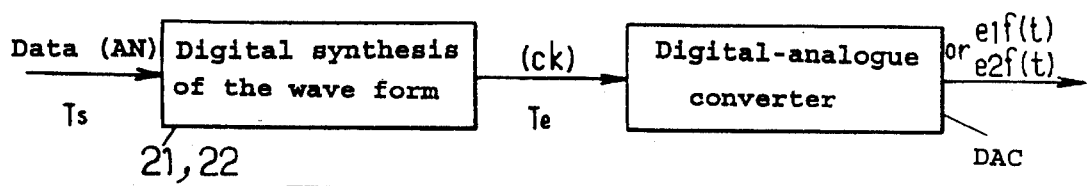
FIG. 2b. THEORETICAL DIAGRAM OF THE FILTERING
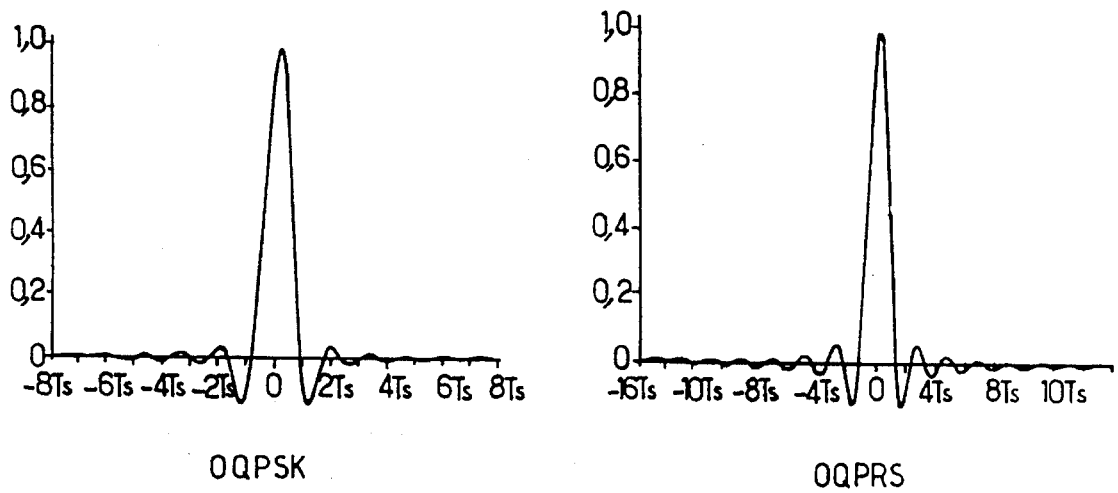
OQPSK   OQPRS
FIG. 2c.   PULSE RESPONSE OF THE SHAPING FILTERS
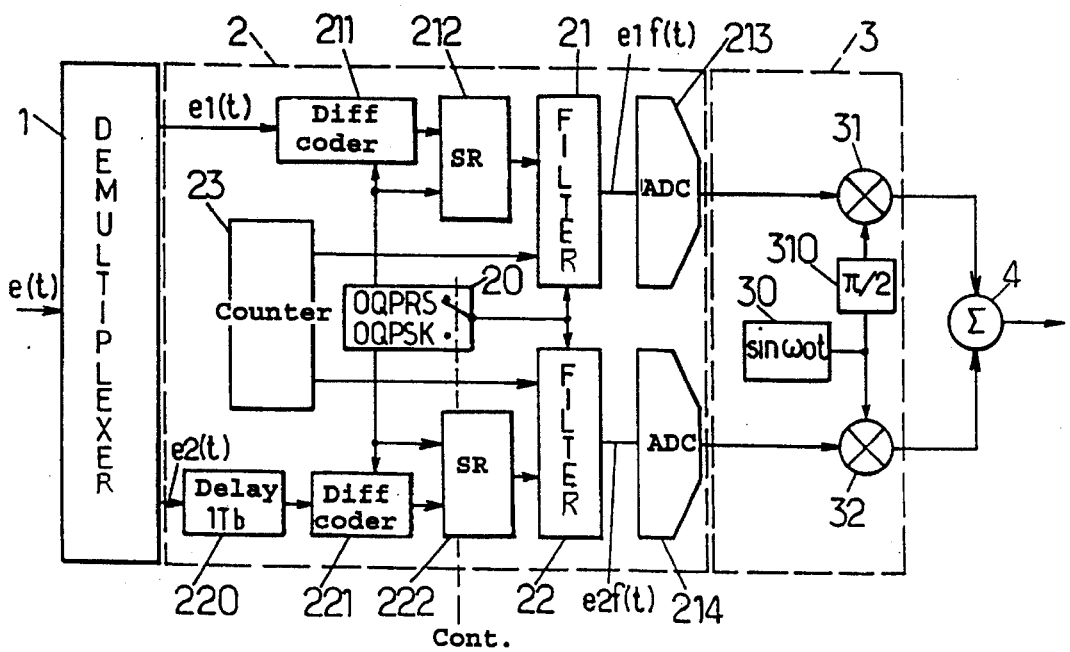
FIG. 3a.   GENERAL THEORETICAL DIAGRAM OF THE MODULATOR

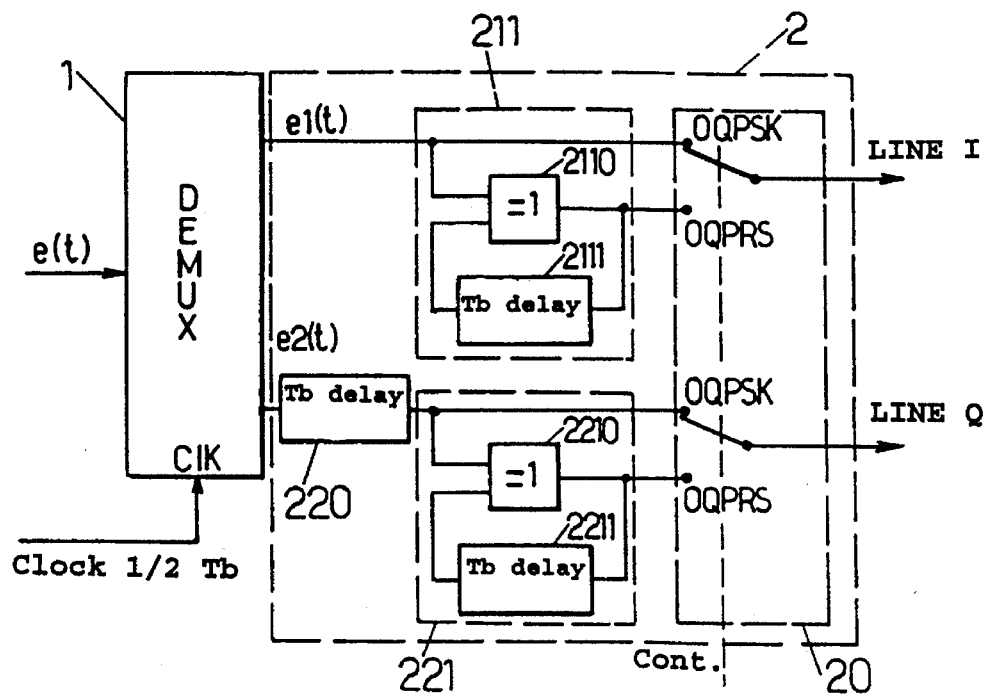
FIG. 3b. THEORETICAL DIAGRAM OF THE DEMULTIPLEXING OF THE SOURCE
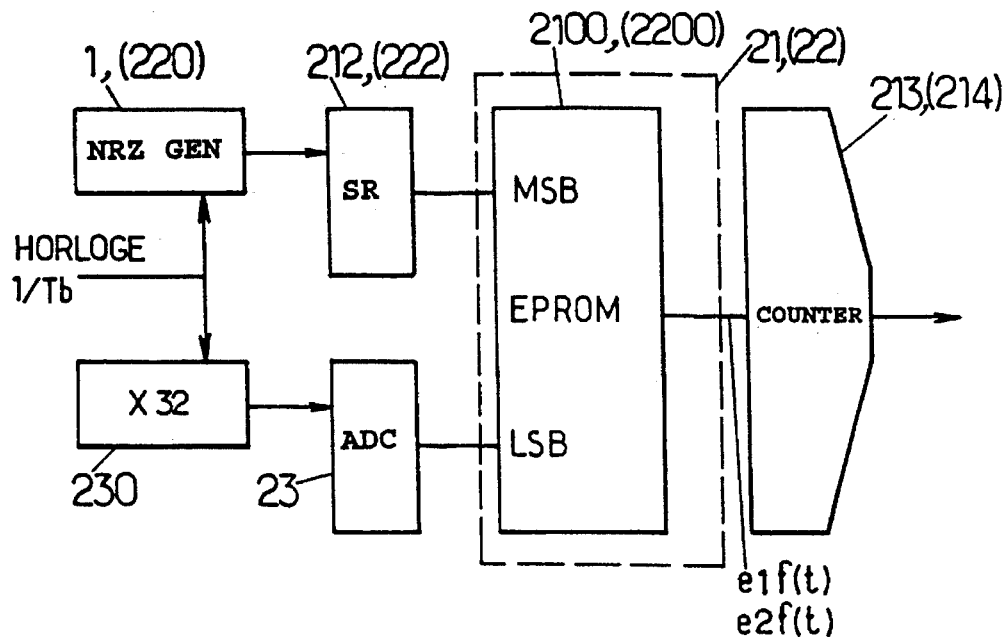
FIG. 3c. THEORETICAL DIAGRAM OF THE SHAPING FILTER

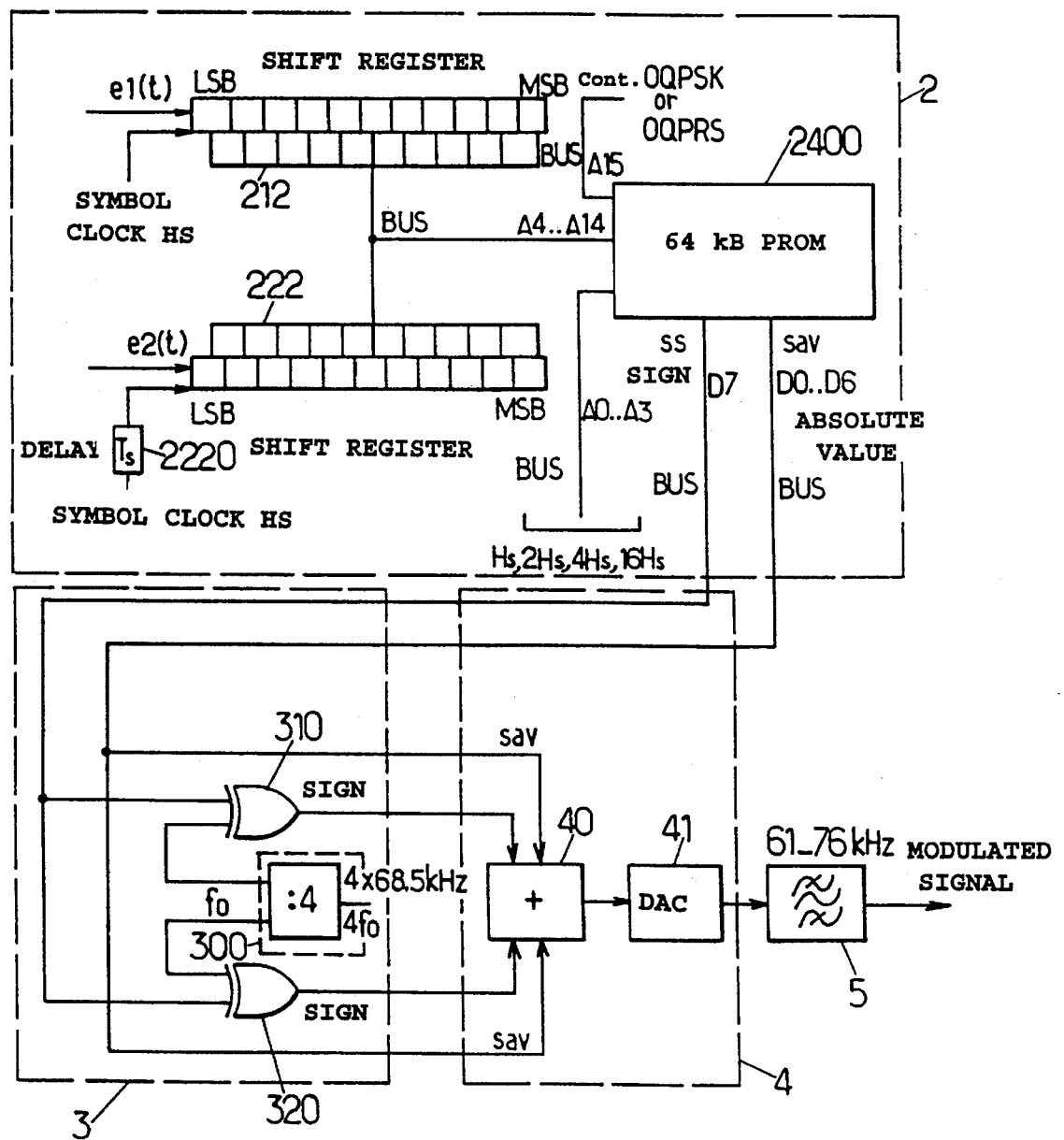
FIG. 4. OQPSK-OQPRS MODULATOR

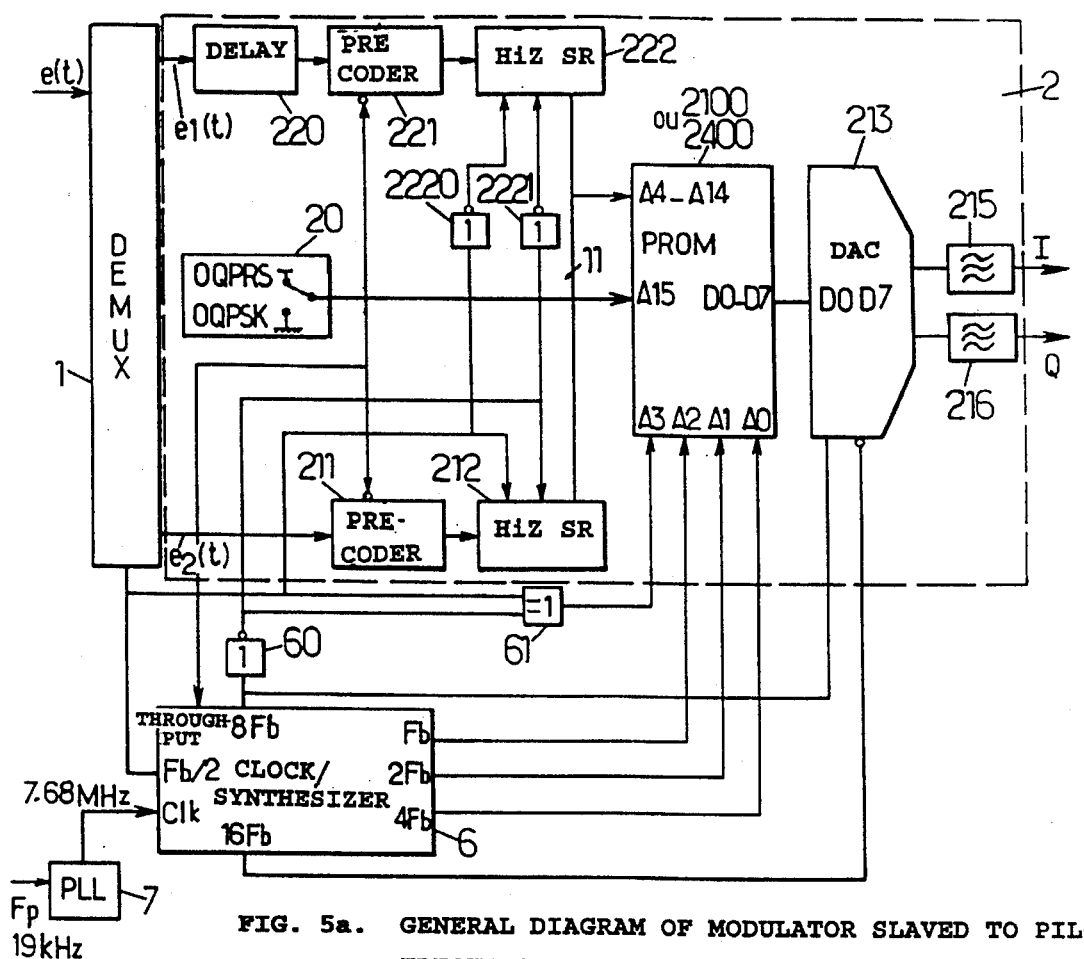
FIG. 5a. GENERAL DIAGRAM OF MODULATOR SLAVED TO PILOT FREQUENCY
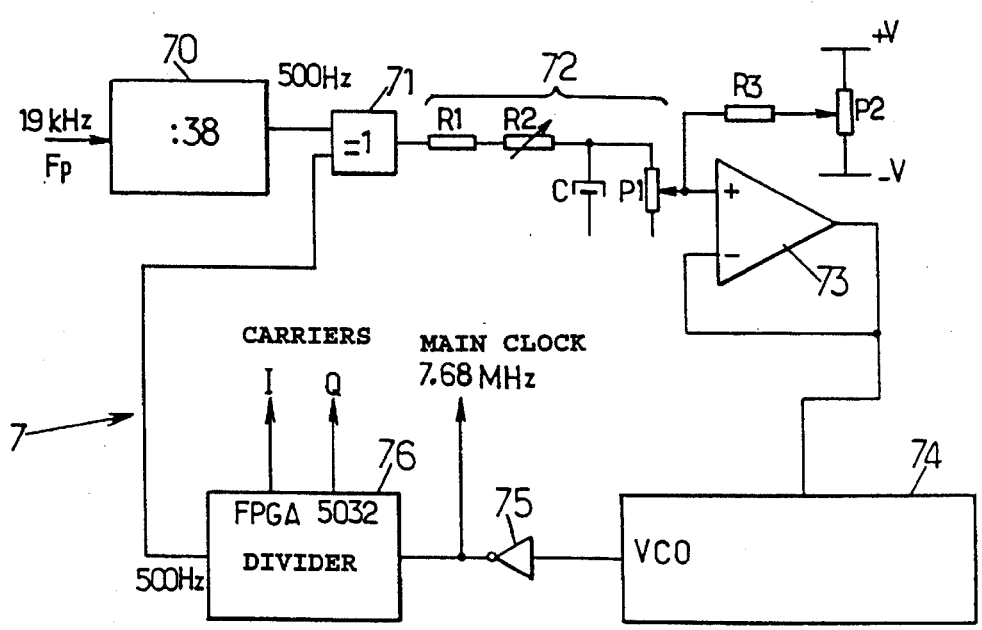
FIG. 5b. PLL BLOCK DIAGRAM

VARIABLE-THROUGHPUT DIGITAL MODULATOR AND ITS USE IN FM RADIO BROADCASTING

The invention relates to a variable-throughput digital modulator, and its use in radio broadcasting with frequency modulation, designated by FM radio broadcasting.

In the European countries, particularly in France, the FM radio broadcasting system allows, in addition to the broadcasting of radio programmes broadcast in frequency modulation, the transmission of service data or information intended for users of car radios, of messaging systems or of remote display. The system used in these countries is the RDS system (Radio Data System). This system consists, as represented in FIG. 1 in the case of a stereophonic transmission, in inserting, into the spectrum of the FM multiplex baseband signal, a subcarrier centred on the central frequency of 57 kHz, which occupies a frequency band of ±2.375 kHz around the abovementioned central frequency. The abovementioned subcarrier wave, in an RDS channel, allows service data to be transmitted, with a low throughput of the order of 1,200 b/s.

However, the low value of the transmission throughput of the RDS channel does not allow new services to be broadcast, such as broadcasting of static images or of information journals.

In order to allow the introduction and promotion of new services, one approach may consist in generating a supplementary channel, in addition to the RDS channel, consisting, for example, of a supplementary subcarrier allowing transmission of supplementary information or data. In the case of transmission of supplementary data, the baseband signal consists of the audio signals and of the supplementary signals as a whole.

Recommendation 450-1 of the CCIR (Comité Consultatif International des Radiocommunications), relating to metric-wave frequency standards, specifies that the central frequency of any supplementary data subcarrier must lie between 15 and 23 kHz or 53 and 76 kHz, without, however, specifying the maximum width of the multiplex baseband signal.

With this aim in view, various systems have been proposed for supplementary data transmission, with a transmission throughput allowing new services to be promoted.

Among these may be mentioned:

the RECEPTOR system developed in the United States of America by the AT&E company. This system allows a supplementary data transmission throughput of 19 kb/s by duobinary coding, then double-sideband amplitude modulation of a subcarrier with central frequency 66.5 kHz. The spectral occupation is ±9.5 kHz around the abovementioned central frequency and the spectrum of the signal of the RECEPTOR system lies in the frequency band 57–76 kHz. This system thus exhibits the disadvantage of overlapping of the spectra of the signals of the RDS and RECEPTOR channels, rendering the RECEPTOR system incompatible with the RDS system, except by introduction of filtering of the low part of the RECEPTOR spectrum, at the cost of a reduction in performance.

The system proposed by the N.H.K. company (Japan Broadcasting Corporation) allows very diverse provisions of services or applications such as teletext, digital sound, by reason of the very high transmission throughput, 48 kb/s. The N.H.K. system employs a QPSK (Quadrature Phase Shift Keying) type modulation process, in which the data signal is modulated around a subcarrier with central frequency 76 kHz. The spectrum of the N.H.K. channel situated between the frequencies 60.4 and 91.6 kHz is compatible with the R.D.S. system. However, the maximum frequency of the multiplex baseband signal, 91.6 kHz, is considerably higher than the 76 kHz maximum transmission frequency, as defined by report 1 065 of the CCIR, RF spectrum of sound radio broadcasting transmitters with frequency modulation, topic 46/10, study programme 46 L/10.

Moreover, the N.H.K. system is capable of contributing to the transmission of a frequency-modulated signal risking causing interference with the adjacent channels, especially in Europe and in France, in which countries the spacing between two channels is 100 kHz. Direct use of the two abovementioned systems can therefore hardly be contemplated.

The object of the present invention is to remedy the abovementioned drawbacks by implementing a variable throughput digital modulator, allowing promotion of new services in FM radio broadcasting, by introduction of a supplementary data transmission channel which is completely compatible both with the abovementioned recommendation 450-1 and with report 1 065 of the CCIR.

Another object of the present invention is the implementation of a variable-throughput digital modulator allowing switching between two transmitted supplementary data throughput values, depending on the applications or services performed, in the course of transmission of these supplementary data.

Another object of the present invention is additionally the implementation of a switchable-transmission throughput digital modulator, without changing the bandwidth of the signal modulated around a carrier wave of the same central frequency.

Finally another object of the present invention is the implementation of a variable-throughput digital modulator allowing the promotion of new services in FM radio broadcasting, completely compatible with the R.D.S. auxiliary data transmission system.

The variable-throughput digital modulator of a digital transmission signal, which is the subject of the present invention, is noteworthy in that it comprises a circuit for time-based demultiplexing of this digital transmission signal into a first and into a second elementary transmission signal, and a first and a second baseband transmission filtering circuit, corresponding to a first type of modulation at a first throughput and to a second type of modulation at a second throughput respectively. The first and the second baseband transmission filtering circuit receive the first and the second elementary transmission signal respectively and deliver a first and a second filtered elementary signal respectively. A circuit is provided for throughout switching control, by switching from the first to the second filtering mode, or conversely, on the basis of a throughput control signal. A circuit for in-phase and phase quadrature modulation of a carrier wave of defined frequency fo receives the first and the second filtered elementary signal respectively on its modulation inputs, and delivers a first and a second modulated carrier signal respectively, and an adder circuit receiving the first and the second modulated carrier signal makes it possible to deliver a resultant modulated carrier signal. A filtering circuit centred on the frequency fo of the carrier wave makes it possible to eliminate the periodicity of the spectrum of the resultant modulated carrier signal, in order to deliver a filtered resultant modulated signal for broadcasting.

The variable-throughput digital modulator which is the subject of the present invention finds an application in the implementation of FM radio broadcast transmitters, for transmitting data supplementary to the auxiliary data of R.D.S. type, for the purpose of promotion of new services made available to users or listeners.

It will be better understood on reading the description and on perusing the drawings below in which, in addition to FIG. 1 relating to the prior art, FIG. 2a represents a theoretical diagram in the form of functional blocks of the variable-throughput digital modulator, the subject of the present invention, FIG. 2b represents a theoretical diagram illustrating the filtering process for shaping the transmission signal, FIG. 2c represents the pulse response of filters for shaping the transmission signal allowing modulation at a first and at a second transmission throughput respectively, FIG. 3a represents an advantageous embodiment of the variable-throughput digital modulator which is the subject of the invention, as represented in FIG. 2a, FIG. 3b represents an embodiment detail of FIG. 3a, relating to the demultiplexing of the samples constituting the transmission signal, FIG. 3c represents a particular embodiment of the shaping filters or baseband transmission filters corresponding to the first type of modulation at a first throughput and to the second type of modulation at a second throughput respectively, FIG. 4 represents a non-limiting preferred embodiment of the variable-throughput digital modulator which is the subject of the invention represented in FIG. 3a, 3b and 3c, FIG. 5a represents the general diagram of a modulator slaved to the frequency of the pilot signal of the stereo multiplex signal, FIG. 5b represents the diagram of a phaselocked loop.

A more detailed description of a variable throughput digital modulator of a transmission signal in accordance with the object of the present invention, will now be given in connection with FIG. 2a and the following figures.

In a general way, the transmission signal, denoted e(t) is indicated as being formed by a sequence of bits of any value representative of the information or of the supplementary data to be transmitted in FM radio broadcasting.

As will be seen in the abovementioned FIG. 2a, the modulator which is the subject of the present invention comprises a circuit i for time-based demultiplexing of the digital transmission signal e(t) into a first e1(t) and into a second e2(t) elementary transmission signal, each also consisting of a series of bits. Thus it will be understood that, for a digital transmission signal e(t) at a bit frequency formed by a square signal of frequency Fb, there is actually, by reason of the demultiplexing, a corresponding symbol frequency Fs which is equal to half of the bit frequency, the symbols or groups of symbols being, obviously, at least partially representative of the supplementary information to be transmitted.

As will be noted in FIG. 2a, the digital modulator which is the subject of the present invention also includes a module 2 for baseband transmission filtering of the first and of the second elementary transmission signal e1(t), e2(t). The baseband transmission filtering module 2 in fact includes a first and a second baseband transmission filtering circuit denoted 21 and 22 respectively, these circuits making it possible to carry out a first type of modulation at a first throughput and a second type of modulation at a second throughput respectively, of the first and of the second elementary transmission signal e1(t), e2(t). The first 21 and the second 22 baseband transmission filtering circuit receiving the first and the second elementary transmission signal respectively deliver a first and a second filtered elementary signal respectively, denoted e1f(t), e2f(t).

As has been represented moreover in FIG. 2a, the baseband transmission filtering module 2 comprises a throughput control input receiving a corresponding signal, denoted cde, this signal making it possible to switch from the first throughput to the second throughput or conversely, by switching from the first type of modulation to the second type of modulation or conversely, as will be described below in the description.

Moreover, the modulator which is the subject of the present invention comprises a circuit for an in-phase and phase-quadrature modulator of a supplementary subcarrier wave, more conveniently designated by carrier wave, with frequency fo, receiving the first and the second filtered elementary signal e1f(t), e2f(t) respectively on its modulation inputs, and delivering a first and a second modulated carrier signal respectively, these signals being denoted spm1, spm2 in FIG. 2a. The modulator 3 conventionally comprises a first and a second modulator circuit 31, 32, fed by the in-phase and phasequadrature carrier wave respectively by an oscillator 30 at the frequency f0.

As has additionally been represented in the abovementioned figure, an adder circuit 4 is provided, which receives the first and the second modulated carrier signal spm1, spm2 and delivers a resultant modulated carrier signal, denoted spmr.

Finally, a filtering circuit centred on the frequency of the carrier wave f0, this circuit being denoted 5 in FIG. 2a, makes it possible to eliminate the periodicity of the spectrum of the resultant modulated carrier signal spmr in order to deliver a filtered resultant modulated signal intended for broadcasting.

It is shown that, in the course of operation, the variable-throughput digital modulator which is the subject of the present invention can thus be controlled in terms of throughput by the throughput control signal, denoted cde, which, via the throughput switching circuit 20, makes it possible to choose the first filtering mode or the second filtering mode respectively of the first and of the second baseband transmission filtering circuit 21 and 22, that is to say finally, by the choice of the corresponding transfer function denoted $He1_1(f)$ and $He1_2(f)$ of the first and of the second filtering circuits 21 and 22, to make a choice of the throughput associated with the corresponding filtering mode, as will be described later in the description.

A more detailed description of the principle of baseband transmission filtering of the filtering circuits 21 and 22 in the first and in the second filtering mode respectively, with their corresponding transmission throughput, will now be given in connection with FIG. 2b.

As represented in the abovementioned figure, it is shown that the first and the second baseband transmission filtering circuit 21, 22 may include, successively in cascade, a module for digital synthesis of a waveform, receiving the first and the second elementary transmission signal e1(t), e2(t) respectively. It is recalled that the digital source or transmission signal e(t) is demultiplexed so as to form the first and the second abovementioned elementary transmission signals. It is shown that the digital synthesis module makes it possible to generate a series of samples corresponding to the first and to the second type of modulation respectively, according to the choice of modulation and thus of throughput adopted.

A digital-analogue converter, denoted DAC in FIG. 2b, receives the series of abovementioned samples and delivers the first and the second filtered elementary signal e1f(t), e2f(t) respectively.

Thus, following the demultiplexing, the original transmission signal e(t) is converted into two signals, satisfying relation 1:

$$e_1(t) = \sum_k a_k \delta(t - kTb) \rightarrow \begin{cases} e_1(t) = \sum_k a_{2k}\delta(t - 2kTb) \\ e_2(t) = \sum_k a_{2k+1}\delta[t - (2k+1)Tb] \end{cases} \quad (1)$$

In the preceding relation Tb designates the bit duration or period, $a_k = \pm/-1$ designates the binary elements of the original transmission signal, $\delta(t)$ designates the Dirac pulse at the instant t=0.

In a general way, it is shown that the transmission filtering according to the transfer function $He1_1(f)$ or $He1_2(f)$ is performed in baseband in digital form, the bandpass analogue filtering performed by the filtering 5 at the output of the modulator which is the subject of the present invention having the function only of eliminating the periodicity of the spectrum of the resultant filtered modulated signal but having no role relative to the shaping of this signal.

As has been represented in FIG. 2b, the baseband filtering of the digital train consisting of the series of symbols [an] sent with a rate 1/Ts with Ts equal to 2Tb, Tb designating the duration or period of the sequence of bits constituting the transmission signal e(t), leads to the filtered signal:

$$c(t) = \sum_k a_n \cdot i(t - nT_s) \quad (2)$$

In the preceding relation i(t) is the elementary shaping pulse and the digital filtering on transmission consists in calculating the series of samples [ck] corresponding to a time-based signal c(t) satisfying the relation:

$$c_k = c(kT_e) \quad (3)$$

The series of samples c(t) is then subsequently converted by the digital-analogue converter DAC at a frequency 1/Te, where Te represents a frequency of conversion into an analogue signal. It is shown that Te designates the sampling period and satisfies the relation Te=Ts/N where N designates the number of samples per symbol an.

For an elementary pulse i(t) of duration lying between [0,LTs] that is to say over an interval extending over L symbols, the previously mentioned series of samples filtered signal is expressed, over the duration of the symbol (L−1)/2:

$$c_k = \sum_{n=0}^{+L-1} a_n \cdot i_{k-nN} \quad (4)$$

where k=0→N−1.

According to one particularly advantageous aspect of the variable digital modulator which is the subject of the present invention, the first and the second type of modulation used are obviously types of modulation which are compatible with the RDS system. In a general way, it is shown that the first type of modulation may consist of a type of continuous-phase modulation with modulation index ½, capable of being broken down into quasilinear, and that the second type of modulation used may consist of an OQPSK modulation, whatever the type of filtering used. Thus, the GMSK modulation type used in the second-generation GSM digital radio communication system, as well as the type of modulation used in the Darc data-broadcasting system may be used.

Moreover, future radio communication systems, known as third-generation systems, are likely to use several types of modulation as mentioned above. The latter appear well adapted to various transmission embodiments, such as the environment within a building, the urban, suburban or rural environment, and are likely to allow the implementation of coding devices including a digital modulator in accordance with the subject of the present invention. Such digital radio communication systems have been described in the article "*ATDMA System Concept*" originating from the conference *Race Mobile Telecommunications Workshop* which took place at Metz, France, from 16 to 18 June 1993, and published by H. J. EUL, SIEMENS AG, Hofmann Straβe 51, D-8000, Munich 70, Germany; M. STREETON, ROKE MANOR RESEARCH LTD., Romsey, Hampshire, SO51 0ZN, United Kingdoms C. MOUROT and A. URIE, ALCATEL RADIOTELEPHONIE, 32, av. Kléber, 92707 Colombes, France. These types of modulation are currently the subject of a common study project, called project SWIFT, this project having the aim of implementing a multi-application radiocommunication service based on high-throughput broadcasting on the FM network.

In one non-limiting embodiment making it possible to obtain high throughputs, the first type of modulation may consist, for example, of OQPRS modulation, the baseband filter with transfer function $He1_1(f)$ being a filter equivalent to duobinary coding.

Likewise, the second type of modulation used, corresponding to the transfer function $He1_2(f)$ is an OQPSK modulation, the baseband filter being a raised-cosine filter, the overlap factor of which, designated by ROLL-OFF FACTOR is taken to be equal to 0.5.

In a general way, it is shown that the OQPSK type of modulation and the OQPRS type of modulation are based on the same principle, the OQPRS type of modulation exhibiting the following differences, with respect to the OQPSK type of modulation:

the demultiplexed bit train undergoes precoding, the response of the shaping filter is different.

For a more detailed description of the OQPSK and OQPRS types of modulation, it would be useful to refer to the article published by Mr. Pascal SCOMAZZON and entitled "Comparative study of digital modulations on an MF subcarrier" in the magazine of UER-Technique, No. 248, August 1991., publisher: Union europen de radiodiffusion Case Postale 67, CH 1218 GRAND SACONNEX GENEVE SWITZERLAND.

In a general way, it is shown moreover that the overall filtering thus obtained satisfies the NYQUIST criterion, with optimal sharing between transmission and reception, which ensures absence of interference between symbols and ideal theoretical performance being obtained in terms of error rate in the presence of Gaussian noise.

FIG. 2c gives a representation of the pulse response of the shaping filters, that is to say the pulse response associated with the transfer functions $He1_1(f)$ and $He1_2(f)$ respectively in the case of the OQPSK and OQPRS types of modulation respectively. The corresponding diagrams are plotted in relative amplitude value on the coordinate axis and as a function of time, the time being indexed with respect to the symbol period Ts.

With reference to relation (4) previously mentioned in the description, it is shown that, for reasons of feasibility, it is appropriate to truncate the pulse response of the equivalent baseband filter for a finite number L of symbols.

Laboratory trials have made it possible to show that the baseband equivalent filters can be limited to LTs with L=11.

It is shown moreover that the number N of samples per symbol an can be chosen to be equal to 16 or 32.

A corresponding embodiment then makes it possible, for a fixed clock frequency of defined value, to obtain a first type of modulation of OQPSK type, performed at a throughput of 19.2 kb/s and a second type of modulation of OQPRS type with a throughput of 30 kb/s for a bandwidth of 15 kHz centred on a carrier wave frequency close to 68.5 kHz.

As far as the actual production of the shaping filtering circuits 21 and 22 represented in FIG. 2a is concerned, it is shown that several possibilities can be envisaged.

The first possibility consists in using a digital signal processor making it possible to perform the data filtering by real-time calculation, by a discrete convolution between the received signal and the pulse response of the shaping filters, as represented in FIG. 2c. This filtering method exhibits the disadvantage of performing a very large number of multiplications/accumulations requiring a cycle time less than 40 ns and thus entailing a significant excess cost.

Another solution may consist in performing filtering by data transcoding, which exhibits the advantage of being cheap and easy to implement, the transcoding operations moreover exhibiting the advantage of requiring at most one read access to a transcoding memory, which makes it possible to deliver the filtered elementary signal e1f(t), e2f(t) directly, as will be described later in the description.

A non-limiting advantageous embodiment of a digital modulator in accordance with the second previously mentioned solution will now be described in connection with FIG. 3a.

In FIG. 3a the essential elements already represented in FIG. 2a are recognized, to which other elements have been added, allowing the abovementioned implementation.

In a general way, in addition to the baseband transmission filtering circuits 21 and 22 already represented in FIG. 2a, the variable-throughput digital modulator, the subject of the present invention, includes, associated with the abovementioned filtering circuit 21 and 22, a shift register, denoted 212 and 222 respectively, each shift register being preceded by a differential coder denoted 211 and 221 respectively. The differential coder 211 receives the first elementary transmission signal e1(t) and the differential coder 221 receives the second elementary transmission signal e2(t) via a delay circuit 220, which makes it possible to introduce a delay of one bit period Tb on the above-mentioned signal.

Moreover, a counter 23 is provided so as to allow discrimination on the L consecutive symbols as mentioned previously in the description. The configuration of the L symbols in each shift register 212, 222, generates, by transcoding, a signal or series of N samples, this signal being defined over one symbol period Ts. At each period Ts, to within a shift of Ts/2, the configuration of the L symbols in each shift register 212, 222 changes, by shifting of one binary element from left to right, and, at each symbol period Ts a new signal, a series of N samples of duration Ts is generated, this signal constituting the filtered elementary signal e1f(t), e2f(t). The counter 23 makes it possible to generate a clock signal at the sample frequency Te, giving access to the N sample values, N=32 or N=16, defining the filtered elementary signal e1f(t), e2f(t) over the duration Ts.

The throughput switching circuit 20 then makes it possible, on the basis of the throughput control signal cde, to act on the differential coders 211 and 221 so as, in fact, to inhibit the differential coding, that is to say the precoding, when the type of modulation chosen corresponds to the first OQPSK type of modulation and, in contrast, to enable precoding, that is to say the operation of the differential coders 211 and 221 when the type of modulation chosen is the second OQPRS type of modulation.

The demultiplexing of the data constituting the transmission signal e(t) and their precoding will be described in connection with FIG. 3b, which repeats a part of the corresponding elements of FIG. 3a. In connection with the abovementioned FIG. 3b, it is shown that each differential coder 211 or 221 can be formed by an exclusive-OR logic circuit bearing the reference 2110, 2210, one input of which is looped onto the output via a delay circuit 2111, 2211, the delay introduced by this circuit being equal to one bit period or duration Tb. It is understood then that the throughput switching circuit 20 may consist, for example, of a logic switch which makes it possible simply to deliver the first elementary transmission signal e1(t) and the second elementary transmission signal e2(t) delayed by one bit duration or period Tb by the delay circuit 220, in the case in which the first OQPSK type of modulation has been chosen, and, on the contrary, the previously mentioned signals precoded by means of the first differential coder 211 or the second differential coder 221 respectively, when the second OQPRS type of modulation has been chosen. These signals are delivered on a line I and a line Q to the shift register 212 or 222 respectively.

A more detailed description of an advantageous embodiment of the baseband transmission filtering circuits 21 or 22 of the variable-throughput digital modulator represented in FIG. 3a will now be given in connection with FIG. 3c.

Knowing the frequency responses of the filtering circuits and, in particular, of the transfer functions $He1_1(f)$ and $He1_2(f)$ of these filters, on the basis of the equations given previously in the description, the pulse responses as represented in FIG. 2c are obtained for the type of modulation, OQPSK or OQPRS respectively, by inverse Fourier transform. The abovementioned pulse responses decrease and become negligible for a signal width greater than eleven bit periods Tb.

In accordance with the advantageous embodiment of the baseband transmission filtering circuits, the subject of the invention, the latter consists in performing filtering by transcoding of values, these values being, obviously, stored in a PROM-type memory circuit, and the PROM filtering being similar to a convolution operation.

For the L=11 significant symbols mentioned previously, each symbol being represented by 1 bit originating from the demultiplexing, that is to say for 2,048 different combinations of these bits for eleven consecutive bits, the results of the convolution product of each of these combinations with the pulse response of the shaping filter, according to the OPQSK or OQPRS type of modulation, can then be stored in the abovementioned memory. In FIG. 3c, the filtering circuit 21 has been represented consisting of an EPROM-type memory 2100 receiving, from the demultiplexer 1, the first elementary transmission signal e1(t) via the shift register 212. In the case of the baseband transmission filtering circuit bearing the reference 22, this one receives the second elementary transmission signal e2(t) via the 1-bit-period Tb delay circuit 220. In this case, the shift register bears the reference 222 and the filtering circuit 22 consists, for example, of an EPROM-type memory 2200. For this reason, and so as not to introduce an additional figure relating to the filtering circuit 22, the demultiplexer 1 delivering the first elementary transmission signal e1(t) and the second elementary transmission signal e2(t) via the delay circuit 220 is represented by the reference 1,220 in FIG. 3c.

In FIG. 3c the numbered references relating to the second filtering circuit 22 and to the circuits which are associated with it, are carried between parentheses.

It is shown that the results of the calculation of the convolution product which are stored in the EPROM memories 2100 or 2200 can be carried out by taking, for example, 352 samples per combination of eleven bits, i.e. 32 samples per bit period Tb. These 32 values correspond to the filtering of the central bit of the combination of L=eleven bits processed taking account of the influence of 5 bits on either side of the central bit. The capacity of the EPROM memory corresponds to that of the product of the number of combinations per 32, the number of values.

Thus, the sequence of input bits and in particular the sequence of bits constituting the first and the second elementary transmission signal is cut up into eleven-bit words by the shift registers 212 or 222 allowing corresponding addressing of the associated filtered values in EPROM memory. The counter 23 formed by a 5-stage counter makes it possible to address 32 values for each combination, and the first or second filtered elementary signal e1f(t), e2f(t) is available on an output BUS of the EPROM memory 2100 or 2200. Moreover, it is shown that the clock signal at the bit frequency 1/Tb is multiplied by 32 by a frequency multiplier 230 in order to address the counter 23. Thus, the shift register 212 or 222 makes it possible to address the high orders of the EPROM memory 2100 or 2200 while the counter 23. addresses the low-order bits of the memory so as to obtain the 32 necessary samples.

As far as the generation of the clock signals is concerned, allowing clocking of all the elements of the variable digital modulator represented in FIG. 3a, it is shown that these signals have to be compatible with the throughputs used of 30 kb/s and 19.2 kb/s associated with each of the types of modulation.

Having regard to the embodiment described in FIG. 3c, in which a frequency 32 times greater than the bit frequency has to be obtained, it is possible to use a multiple quartz generator of 960 kHz and of 614.4 kHz, the basic clock frequency of which is equal, for example, to 15.36 MHz. Frequency division then makes it possible to obtain the various clock signals necessary for the clocking of the assembly.

Finally it is shown, in connection with FIG. 3c, that the first and the second filtered elementary signal are then delivered by the output bus of the EPROM memory 2100, 2200 to the corresponding analogue-digital converter 213 or 214 so as to drive the modulator circuit 3 by the corresponding analogue signals.

One preferential embodiment of the variable-throughput digital modulator which is the subject of the present invention will now be described in connection with FIG. 4.

In the abovementioned figure, the demultiplexer 1 is not represented so as not to overload the drawing. In a general way, it is shown that this embodiment makes it possible to dispense with any precoding operation necessary for the OQPRS type of modulation, the filtering operation being carried out, obviously, by pure transcoding of the first and of the second elementary transmission signal e1(t), e2(t), i.e. by reading the values stored in a single PROM memory 2400, these values being representative of the first and of the second filtered elementary transmission signal e1f(t), e2f(t) mentioned above.

The baseband transmission filtering circuits are then formed by the first shift register 212, the second shift register 222, which are interconnected by a link by BUS to the previously mentioned memory 2400. The shift register 212 receives the first elementary signal e1(t) as well as a clocking signal Hs at symbol clock frequency. This clock signal makes it possible to carry out sampling of the corresponding symbols.

The shift register 222 receives the second elementary transmission signal e2(t) as well as the abovementioned symbol clock signal, delayed by a duration equal to the symbol sampling period Ts. It is recalled that, in this case, Ts=2.Tb. Each shift register 212, 222, delivers, alternately every two periods of the symbol sampling clock signal HS, a corresponding symbol on the BUS-type line, interconnected to the PROM memory 2400. Thus the abovementioned PROM memory circuit, of programmable type, alternately receives the symbols formed by the eleven bits delivered by each shift register 212 and 222, as well as the throughput control signal cde consisting, for example, of a logic signal representative of the type of modulation and thus of the throughput chosen. The PROM memory circuit 2400 then, by transcoding, delivers a sign signal ss and a signal of absolute value, denoted sav, these signals being, obviously, representative of the first and of the second filtered elementary signal.

In the embodiment of FIG. 4, it is shown that the PROM-type memory 2400 can have a memory capacity of 64 kB, the 16-bit address of the abovementioned memory being made up, for example, of:

- the chosen throughput and consequently the type of modulation adopted, OQPSK or OQPRS,
- the content of one of the shift registers 212 or 222 which represent a combination formed by eleven data symbols to be filtered,
- the symbol clock Hs and bit signals, the combination of which represents the rank of the sample among the 32 samples of each symbol.

In practice, it is shown, by way of non-limiting example, that the BUS-type link makes it possible, for example, to transmit the bits A0 to A3 relating to the symbol clock signals HS, 2HS, 4HS and 16HS, the eleven bits A4 to A14 which are representative of the combination delivered by each shift register and the bit A15 representative of the throughput control signal cde. The first and the second filtered elementary signal delivered by the PROM memory 2400 is delivered, for example, coded over 8 bits D0 to D6 relating to the absolute value and bit D7 relating to the sign of each signal.

As is additionally represented in FIG. 4, the in-phase and phase-quadrature modulator circuit 3 may consist of a digital modulator comprising two exclusive-OR type circuits denoted 310 and 320, receiving the sign signal ss on a first input and a clock signal on a second input, the frequency of which is equal to that of the carrier wave f0. It is shown that the carrier-frequency clock signal f0 can be formed by a divide-by-4 circuit denoted 300, which receives as input a clock signal of frequency 4.f0. It is shown, needless to say, that the circuit 300 plays the role of the circuit 30 while the circuits 310 and 320 play the role of the circuits 31 and 32 respectively in the in-phase and phase-quadrature analogue modulator as they are represented in FIG. 2a.

Moreover, a bit-concatenation circuit 40 receives, on the one hand, the signal delivered by each exclusive-OR type circuit 310, 320, and, on the other hand, the sign signal ss which are delivered by the PROM-type memory circuit 2400.

It will be understood, needless to say, that the digital signals originating from the exclusive-OR circuits 310, 320 are added together digitally to deliver a resultant digital signal, which is converted into an analogue signal by a digital-analogue converter 41, this signal constituting the resultant modulated carrier signal spmr.

A description of an advantageous embodiment of the modulator which is the subject of the present invention, in which slaving of the throughputs of the first and of the second type of modulation and of the frequency of the carrier signal f0 to the pilot frequency Fp=19 kHz of the stereo multiplex signal represented in FIG. 1 are carried out, will be given in connection with FIGS. 5a and 5b.

In the embodiment represented in FIG. 5a, a simplification has furthermore been introduced with respect to the embodiment represented in FIG. 3a or 4, the same elements, however, bearing the same references as in the abovementioned figures. In this embodiment, the number N of samples processed per meaningful symbol is divided by two and brought back from 32 to 16, the basic frequency of the clock signal clk being divided by two and brought back from 15.36 MHz to 7.68 MHz, although the throughputs of the first and of the second type of modulation, OQPSK, OQPRS are held at the preceding values of 19.2 kb/s and 30 kb/s respectively. The capacity of the PROM filtering memory 2100 or 2400 can thus be divided by two, which makes it possible to use a single PROM memory of the same capacity, instead of two, by using multiplexed addressing of the PROM memory 2100 (2400) on the basis of signals which are precoded or not precoded, delivered over a depth of 11 bits by the shift registers 212 or 222, depending on the filtering mode selected, OQPRS or OQPSK, as described previously in the description. By reason of the multiplexed addressing of the PROM memory 2100 or 2400 in the embodiment of FIG. 5a, the data of the digital signal which is delivered by the abovementioned shift registers are latched. In the abovementioned embodiment, the shift registers 212 and 222 consist of three-state latches wired as shift registers. The assembly is controlled by a clock 6 which receives the basic frequency of the clock signal clk=7.68 MHz via a phase-locked loop 7 receiving the signal at pilot frequency Fp=19 kHz. The clock 6 delivers secondary clock signals at the frequency Fb/2, Fb, 2Fb, 4Fb, 8Fb and 16Fb, where Fb designates the bit frequency.

The relationships between symbol frequency Fs, bit frequency Fb and sampling frequency Fe are restated in the table below:

| Symbols Description | | Fb = 2Fs = 1/Tb | | Ts = 2Tb | Fe = 16Fs = 8Fb |
|---|---|---|---|---|---|
| | Fb: | bit frequency | Ts: | symbol period | Fe: sampling frequency |
| | Fs: | symbol frequency | Tb: | bit period | |
| OQPSK | | 19.2 kbits/s | | ≈104.17 μs | 153.6 kHz |
| OQPRS | | 30 kbits/s | | ≈66.67 μs | 240 kHz | with:
Fclk = 7.68 MHz          Fclk = frequency of the local oscillator
Fclk = 50 × Fe = 400 × Fb    in OQPSK
Fclk = 32 × Fe = 256 × Fb    in OQPRS
Fclk = 112 × F0 ≈ 68.571 kHz  in OQPSK and OQPRS
f0 = frequency of the supplementary subcarrier or carrier wave.

Thus, the secondary clock signals 16Fb, 8Fb make it possible to control the digital-analogue converter 213, which is followed by analogue band filters 215, 216, the signals 4Fb, 2Fb, Fb and 8Fb, Fb/2 via an inverter 60 and an exclusive-OR gate 61, the sequencing of the read addressing of the PROM 2100 or 2400, the signal Fb/2, the demultiplexer 1, the signal 8Fb, directly by two inverters in cascade 60, 2221 and, via the inverter 60, the shift registers 222 and 221 respectively, the signal Fb/2, the clocking of the shift registers 222, 212, via an inverter 2220 and directly respectively.

Finally, it is shown that in the case of FIG. 5a, the signals delivered by the PROM filtering memory 2100 or 2400, corresponding to the first and to the second filtered elementary signal e1f(t), e2f(t) respectively are then directly converted into an analogue signal by a digital-analogue converter 213, then filtered by low-pass filters 215, 216 to deliver the first and the second filtered elementary signal respectively in analogue form, before transposition.

In FIG. 5b, the phase-locked loop 7, PLL, has been represented, which comprises a frequency divide-by-38 circuit referenced 70, receiving the pilot frequency Fp and delivering a divided pilot signal, an exclusive-OR gate 71 carrying out the phase comparison between the divided pilot signal and a divided local oscillator signal, a loop filter 72 of attenuated low-pass firstorder type, with variable time constant, and a potentiometric assembly 73 making it possible to pick off a fraction of the filtered output signal delivered by the filter 72. The potentiometric assembly 73 controls a voltage-controlled oscillator 74 which delivers the clock signal clk at the basic frequency of 7.68 MHz through a shaping circuit 75. A frequency divide-by-15 circuit 360 delivers a divided local oscillator signal to the exclusive OR gate 71 for phase comparison with the divided pilot signal. The local oscillator 74 is a very stable oscillator with power supply stabilized by Zener diodes so as to obtain a quiescent frequency as close as possible to 7.68 MHz, which makes it possible to define a narrow pull-in range and thus to reduce the phase jitter related to the considerable factor of multiplication of the pilot frequency (15 360).

Finally, it is shown that the clock 7 may comprise a frequency synthesizer, incorporated or not incorporated in the latter, so as to control the frequency of the auxiliary clock signals delivered by the latter. This makes it possible, as required, to obtain a first and a second throughput, which is variable and adjustable, continuously for example, within a range of throughput values proportional to the variation in frequency of the clock signals.

A particularly high-performance variable-throughput digital modulator has thus been described, making it possible not only to carry out switching between two discrete values of throughput in the course of operation but also to modulate the abovementioned discrete values in the course of this operation, depending, particularly, on the conditions of supplementary information broadcasting in FM radio broadcasting.

We claim:

1. Variable-throughput digital modulator of a transmission digital signal e(t) comprising:

means for time-based demultiplexing of said transmission digital signal e(t) into a first and a second elementary transmission signal e1(t), e2(t) respectively first and second baseband transmission filtering means corresponding in a first filtering mode to a first type of modulation at a first throughput and in a second filtering mode to a second type of modulation at a second throughput respectively, said first and second baseband transmission filtering means receiving said first e1(t) and said second e2(t) elementary transmission signal respectively, and delivering a first and a second filtered elementary signal, e1f(t), e2f(t) respectively;

throughput switching control means for switching from the first to the second filtering mode, or conversely, in response to a throughput control signal;

in-phase and phase-quadrature modulators of a carrier wave of frequency f0 receiving, on their modulation inputs, said first and said second filtered elementary signal respectively and delivering a first and a second modulated carrier signal respectively;

adder means receiving said first and second modulated carrier signal and delivering a resultant modulated carrier signal; and filtering means centered on the frequency of said carrier wave f0 making it possible to eliminate the periodicity of the spectrum of said resultant modulated carrier signal in order to deliver a filtered resultant modulated signal for broadcast.

2. Modulator according to claim 1, wherein said first and second baseband transmission filtering means each comprise successively in cascade;

a module for digital synthesis of a waveform, receiving said first and second elementary transmission signal e1(t), e2(t) respectively, each constituting a series of symbols, said synthesis module forming a baseband filter, making it possible to generate a series of samples corresponding to the first and to the second type of modulation respectively;

a digital-analogue converter receiving said series of samples and delivering said first and said second filtered elementary signal e1(t), e2(t) respectively.

3. Modulator according to claim 2, wherein said first type of modulation is a continuous-phase modulation with index 1/2 of quasi-linear type, and in that the second type of modulation is OQPSK modulation.

4. Modulator according to claim 3, wherein said first type of modulation being OQPRS modulation, said baseband filter is a filter equivalent to duo-binary coding, and said second type of modulation being OQPSK modulation, said baseband filter is a raised cosine filter.

5. Modulator according to claim 4, wherein, for a fixed clock frequency of defined value, said first and said second type of modulation are performed at a throughput of 30 kb/s and 19.2 kb/s respectively for a band width of 15 kHz centered on a frequency of the carrier wave f0 close to 68.5 kHz.

6. Modulator according to claim 1, wherein said first and second filtering means include:

a shift register receiving said first and second transmission signal respectively, as well as a symbol sampling signal, directly and delayed by a period T of the period of said symbol sampling signal respectively, each shift register delivering a corresponding symbol, alternately every two periods of said symbol sampling clock signal; and a programmable PROM-type memory circuit, receiving said symbols as well as a variable representative of the type of modulation and throughput chosen, alternately, and delivering, by transcoding, a sign signal and an absolute-value signal which are representative of said first and of said second filtered elementary signal.

7. Modulator according to claim 6, wherein said in-phase and phase-quadrature modulators are formed by a digital modulator comprising:

two circuits of exclusive-OR type, each receiving, on a first input, said sign signal and, on a second input, a clock signal, the frequency of which is equal to that of said carrier wave f0;

a bit-concatenation circuit, receiving, on the one hand, the signal delivered by each exclusive-OR type circuit and, on the other hand, said sign signal delivered by said PROM-type memory circuit, and delivering said modulated transmission signal in digital form; and a digital-analog converter circuit, receiving said transmission signal modulated in digital form and delivering a corresponding analogue transmission signal.

8. Modulator according to claim 1, wherein said transmission digital signal is a stereo multiplex signal with a pilot frequency Fp=19 kHz, said first and second filtering means are slaved to said pilot frequency of said stereo multiplex signal, via a phase-locked loop and a clock, which makes it possible to slave the throughputs of said first and second type of modulation and the frequency of said resultant modulated carrier signal to said pilot frequency.

9. Modulator according to claim 8, wherein said clock includes a frequency synthesizer for controlling the frequency of the clock signals delivered by said clock in order to obtain a first and a second throughput which is variable and adjustable within a range of throughput values proportional to the variation in frequency of said clock signals.

10. Modulator according to claim 1, wherein said transmission digital signal comprises supplementary information in FM radio broadcasting.

11. A method of digital modulation for broadcasting comprising the steps of:

time-based demultiplexing a transmission digital signal into a first and a second elementary transmission signal;

first baseband transmission filtering said first elementary transmission signal via a first type of modulation at a first throughput and delivering a first filtered elementary signal;

second baseband transmission filtering said second elementary transmission signal via a second type of modulation at a second throughput and delivering a second filtered elementary signal;

switching between said first baseband transmission filtering and said second baseband transmission filtering on the basis of a throughput control signal;

in-phase modulating a carrier wave frequency receiving said first filtered elementary signal as a modulation input and delivering a first modulated carrier signal;

phase-quadrature modulating said carrier wave frequency receiving said second filtered elementary signal as a modulation input and delivering a second modulated carrier signal;

adding said first and said second modulated carrier signal and delivering a resultant modulated carrier signal;

eliminating the periodicity of the spectrum of said resultant modulated carrier signal; and delivering a filtered resultant modulated signal for broadcast.

12. The method recited in claim 11, wherein said transmission digital signal comprises supplementary information in FM radio broadcasting and said method further comprises transmitting said filtered resultant modulated signal.

* * * * *